April 12, 1949.

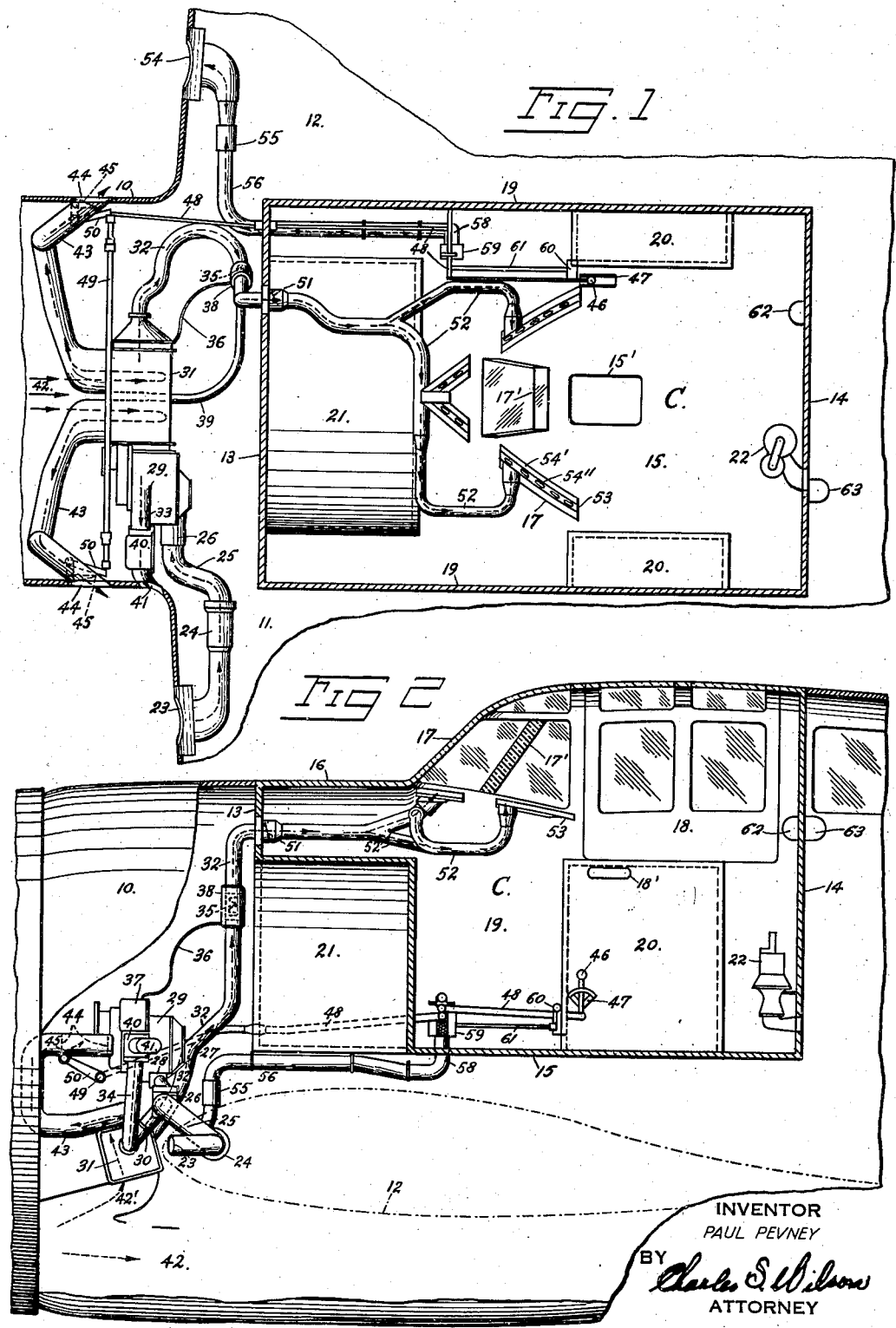

P. PEVNEY 2,466,779

AIR CONDITIONING AND PRESSURIZING
SYSTEM FOR AIRCRAFT

Filed Nov. 16, 1944

INVENTOR
PAUL PEVNEY
BY
*Charles S. Wilson*
ATTORNEY

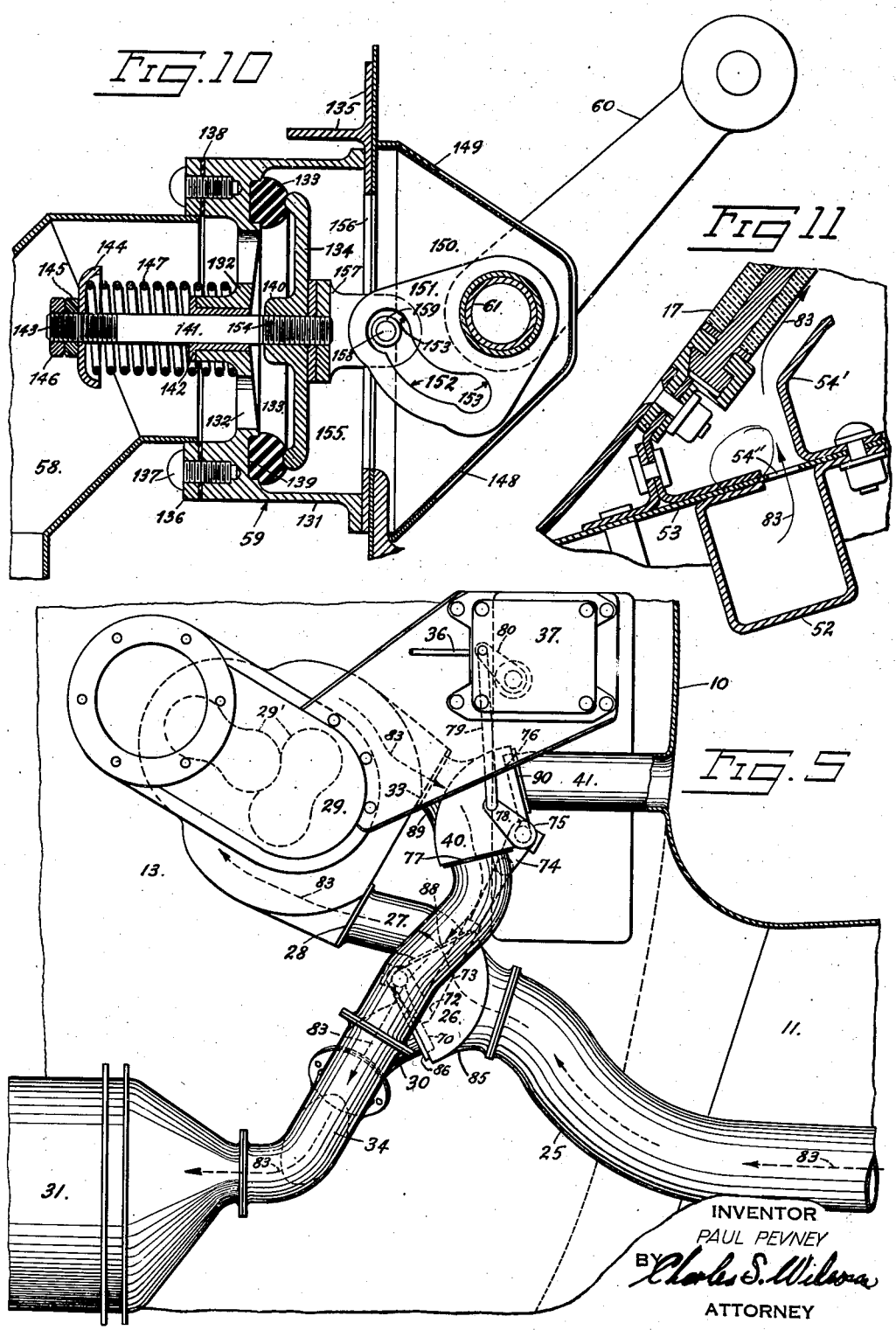

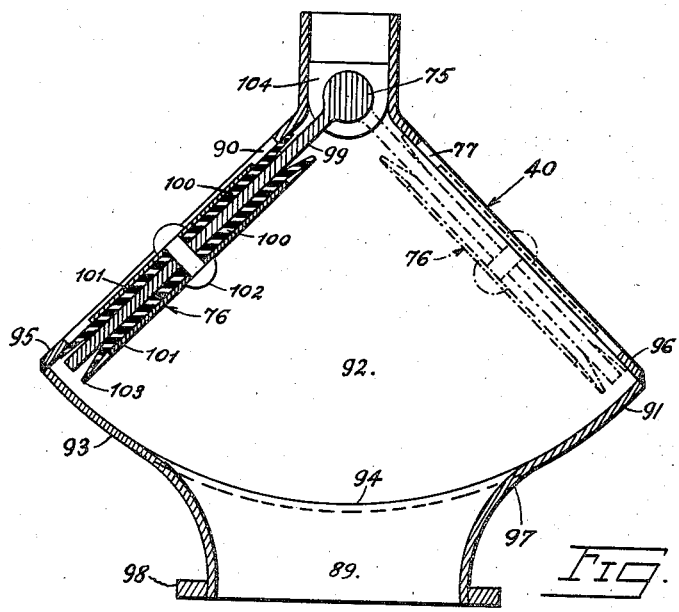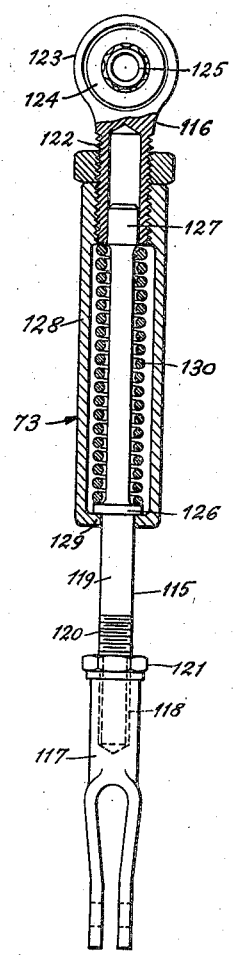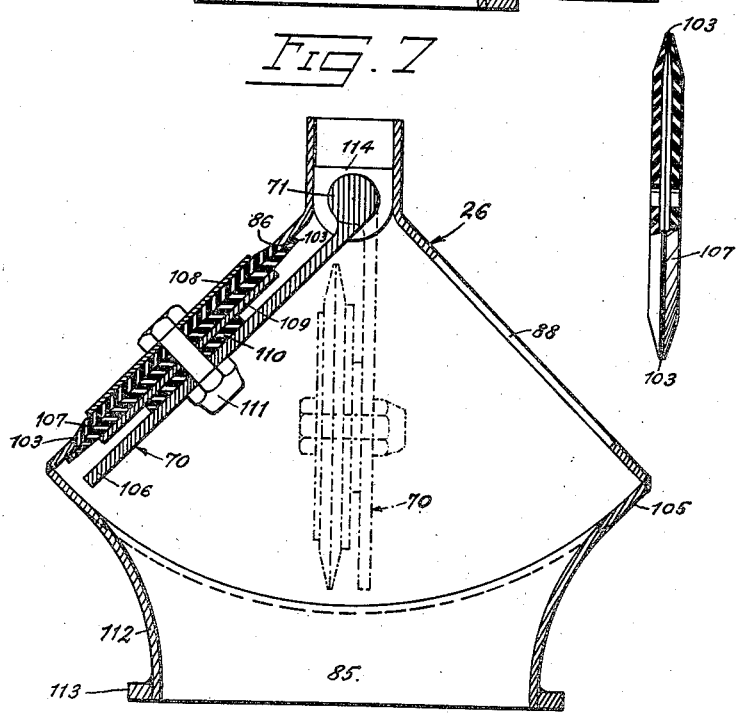

Patented Apr. 12, 1949

2,466,779

UNITED STATES PATENT OFFICE 2,466,779

AIR-CONDITIONING AND PRESSURIZING SYSTEM FOR AIRCRAFT

Paul Pevney, Nassau Shores, N. Y., assignor to Republic Aviation Corporation, Farmingdale, N. Y., a corporation of Delaware Application November 16, 1944, Serial No. 563,752

19 Claims. (Cl. 98—1.5)

1

The invention relates to aircraft and proposes an air-conditioning system for closed and sealed compartments thereof, such as cabins, cockpits, gun turrets, and the like, hereinafter designated generally as "pressurized cabins," in which a predetermined air pressure and temperature is maintained regardless of the altitude of the aircraft in flight. The present invention contemplates the provision of a pressurized cabin or compartment with an air-circulating system which may be connected directly to the atmosphere exterior of the cabin or compartment, or which may be so regulated that air under pressure may be delivered to the cabin or compartment and to the system from a suitable source of compressed air, as for example, a super-charger. It is further proposed to render the instant system sufficiently flexible to operate under different and variable conditions and to insure at all times during flight either an adequate supply of fresh air to the cabin, or delivery of the proper volume of supercharged air of suitable density and temperature to assure the comfort of the occupants of the pressurized cabin.

An object of this invention is to provide the pressurized cabin of an aircraft with an air conditioning system in which the changeover from the outside or open circulation to the inside or forced circulation, or vice versa, may be controlled manually or may be controlled automatically in response to changes of temperature of the air in the cabin independently of the altitude attained by the aircraft.

Among its other objects the present invention also contemplates the inclusion of a constantly operating, engine driven cabin supercharger in an aircraft having a sealed cabin or compartment so coordinated with associated valves and controlling means that air under pressure may be delivered to the cabin or compartment by said supercharger or, in the alternative, may be discharged into the exterior atmosphere, and in the former event the air under pressure delivered to the cabin may be automatically maintained at a predetermined temperature; the operation of the supercharger being entirely ineffective where neither compressed and/or heated air is required.

Another object of the invention is to provide an air-conditioning system for pressurized cabins that embodies means to automatically maintain the temperature within the cabin substantially constant regardless of altitude and regardless of the changes in external atmosphere, employing, in so doing, only the heat of compression generated by the supercharger of the system and

2 the cooling effect of the slip stream of the propeller.

To cool the cabin supercharger a constant circulation of cooling air through the supercharger is provided to prevent its overheating when acting merely as a heater, or when idling or operating ineffectively.

With the above and other objects in view, as will be apparent, this invention consists in the construction, combination and arrangement of parts, all as hereinafter more fully described, claimed and illustrated in the accompanying drawings, wherein:

Fig. 1 is a horizontal sectional fragmentary view through fuselage and wing roots of aircraft at the cabin or cockpit to illustrate the relationship of the main components of the conditioning system to each other and to the aircraft structure;

Fig. 2 is a longitudinal and vertical sectional view at right angles to the plane of Fig. 1;

Fig. 5 is a similar view wherein the controls are shown adjusted for flight at relatively high altitudes;

Fig. 6 is enlarged, sectional view showing one of the two main air control valves of the system;

Fig. 7 is a view similar to Fig. 6 showing the other of the two main air control valves of the system;

Fig. 8 is a sectional view of a part of the valve shown in Fig. 7;

Fig. 9 is a sectional view of an extensible rod establishing a mechanical inter-connection between the two main air control valves of the system;

Fig. 10 is a sectional view of a manually operated emergency valve forming part of the safety control of the present system; and Fig. 11 shows a detail of a defrosting means associated with the conditioning system of this invention.

Figure 3:
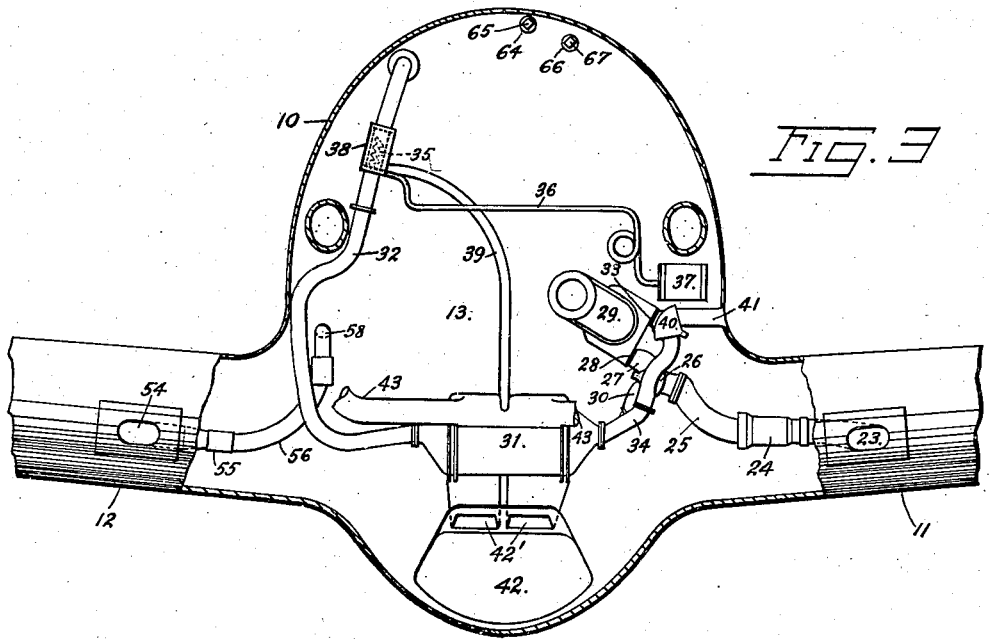
Fig. 3 is a transverse vertical section through the cabin or cockpit showing the wing roots partly in elevation and revealing components of the system arranged forward of the cabin or cockpit.

Referring more especially to Figs. 1 to 3 of the drawings, it will be seen that the air conditioning system constituting this invention is shown and described as adapted to a single-seater fighter aircraft having a fuselage 10, a left or port wing 11, a right or starboard wing 12 and an enclosure forming a sealed compartment or cabin C in the fuselage.

This sealed compartment or pressure cabin C extends fore-and-aft from a firewall 13 to the rear bulkhead 14 and vertically from the floor 15 to a roof formed by a fixed part 16 of the fuselage skin, a fixed windshield 17 and a hinged canopy 18. The cabin side walls 19 include two opposite removable sealed panels 20. At the front of the compartment or cabin, the fire wall 13 has a relatively large opening therein sealed and separated from the compartment or cabin C by the inwardly extending portion 21 of the fire wall to provide a housing for a fixed part of the power plant of the aircraft, such as a fuel tank (not shown).

All movable controls passing through the walls of the pressurized cabin or compartment C or any other closed and sealed part of the aircraft to the exterior of the fuselage 10 are provided with suitable airtight seals such as shown and described in co-pending applications Serial Nos. 511,542 filed November 24, 1943, and which matured into U. S. Patent No. 2,444,113 on June 29, 1948, for flexible control members; and 511,543 filed the same date, and which matured into U. S. Patent No. 2,441,206 on May 11, 1948, for rigid control members. The rectangular opening 15' in the floor 15 for the pivotal mounting of the airfoil control is likewise sealed against the passage of air through said opening 15'. A suitable seal for this purpose is described and shown in co-pending application Serial Number 542,061 of June 26, 1944.

Instruments which depend upon a vacuum source for their operation are manifolded through a vacuum regulator. Service access doors in the pressurized cabin or cockpit C are provided with sealing gaskets applied with suitable sealing compounds serviceable at wide range temperatures and all seams or joints embodied in the structure making up said cabin or cockpit are similarly and suitably sealed. Many types of gaskets and materials may be found for this purpose but since they, per se, form no part of the present invention they are not shown nor described.

The windshield 17 may be formed of any suitable transparent panels mounted and sealed in a metallic frame, but are preferably made of laminated glass and plastic panels constructed, mounted and sealed as described in co-pending application Serial No. 519,459 filed January 24, 1944. This windshield is provided with the usual transparent armor plate 17'.

The canopy 18 or transparent enclosure of the cabin or cockpit C may be of any known and adaptable construction but is preferably made of two symmetrical doors hinged to each other at and along the top center line of the fuselage and at their free sides releasably latched to the upper longerons of the fuselage by lever actuated and sealed locks on each side of the cockpit. A decompression valve may be provided for each lock and so coordinated with the lock that the pressure within the cabin or cockpit C is equalized with atmospheric pressure prior to the full release of the doors constituting the canopy 18. Such a lock and coordinated valve is shown and described in co-pending application Serial No. 525,131 filed March 4, 1944, and which matured into U. S. Patent No. 2,444,114 on June 29, 1948. The simultaneous operation of both lever operated locks 18' permits the release of both doors with the consequent complete removability of the canopy 18.

In the illustrated embodiment of the present invention a cabin pressure regulator or automatic outlet valve 22 is provided to maintain suitable conditions of air pressure within the pressurized cabin C at all elevations of flight independently of the changes in atmospheric pressure. This outlet valve may be of any known adaptable automatic type such as that disclosed in U. S. Patent No. 2,208,554 issued July 16, 1940.

While the outlet valve 22 regulates the air pressure within the cabin C by controlling the outflow of air from the cabin to the atmosphere, the system of this invention determines the pressure governing the rate of inflow of air into the cabin and regulates the ventilation and temperature of the air within the cabin.

A proper understanding of the instant invention must be predicated upon an appreciation of several postulates which govern or control pressure-altitude relationship to be maintained in flight. These are:

1. The conditioned cabin air pressure should be sufficiently high to avoid impairing the safety and comfort of occupants, and be so coordinated with atmospheric pressure that below a predetermined altitude the cabin pressure will gradually approach atmospheric pressure to the end that substantially atmospheric pressure will exist within the cabin for landing or take-off.

2. The maximum differential between cabin and atmospheric pressure as determined by the altitude attained by the aircraft and the choice of this conditioning pressure should not impose prohibitive structural requirements.

3. The maximum ratio of cabin absolute pressure to atmospheric pressure should not necessitate inordinate weight and size of, or power consumption by the air compressor or supercharger utilized to compress the air fed to the cabin.

It has been found in practice that these conditions are met best when substantially free circulation of atmospheric air is maintained in the cabin up to about 10,000 feet elevation, whereupon a predetermined cabin pressure—substantially equivalent to atmospheric pressure at an elevation of 10,000 feet—is established and maintained at all altitudes above 10,000 feet, within the productive limits of the cabin supercharger.

Ram air for pressurizing the cabin C is admitted through an air intake 23 provided in the leading edge of the port wing 11, and is conducted by a conduit or intake pipe 25 through fluid trap 24 to a first three-way valve 26 to be hereinafter more fully described. At relatively low altitudes and, in summer, under normal seasonal temperature conditions, this valve has usually its two outlets 86—88 open, one (88) communicating through a pipe 27 to the inlet 28 of a cabin air supercharger 29 to be vented to atmosphere through the tube 41 as will be described, and the other (86) communicating through a by-pass 30 to a cooler 31 which in turn communicates with the cabin C through a pipe 32. At relatively high altitudes—that is, above 10,000 feet—with a concomitant drop in external temperature below a predetermined minimum, the outlet of the aforesaid first three-way valve 26 communicating directly with the cooler 31 through the by-pass 30 is closed and all air entering through the intake 23 is fed to the inlet 28 of the supercharger-heater 29 through the pipe or conduit 27. This air delivered to the cabin supercharger 29 is compressed by the lobes 29' of the supercharger 29 thereby being heated. From the outlet 33 of the supercharger 29 the heated compressed air is discharged into a pressure line 34 for delivery to the cooler 31. The pipe or duct 32 conducts the air from the cooler 31 to the sealed cabin or compartment C.

The temperature of the compressed air thus admitted into or delivered to the cabin C is controlled by a thermostatic device comprising a sealed temperature responsive element 35 positioned in the pipe 32 and connected by means of a tube 36 to any known type modulator (not shown), which controls the switches of a reversible electric motor 37. The temperature responsive element 35 and the modulator per se form no part of this invention and are well known and purchasable in various forms on the open market. This motor controls the operation of a second three-way valve 40 as well as the first three-way valve 26. The outlet 33 of the cabin supercharger 29 connects with the inlet of the valve 40. The valve 40 has two outlets, one outlet 77 communicating with the pressure conduit 34, and the other outlet 90 communicating with the external atmosphere through a spillway 41.

Simultaneously with the operation of this second valve 40, the motor 37 controls the operation of the first valve 26. The mechanical connection between these two valves 26 and 40 is such that when the plate 76 of valve 40 is swung through 90 degrees to close either of the outlets 77—90 of this valve, the plate 70 of the valve 26 is swung through only 45 degrees to take an intermediate position between the two outlets 86—88 of the valve 26.

The operation of the controls aforesaid may be adjusted so that they become operative to maintain the temperature of the air entering the pressurized cabin or compartment C at between 95° and 105° Fahrenheit, which is thought to be the best temperature for the air entering the cabin. This adjustment of the effect of the temperature responsive device 35 is accomplished in a standard manner by the modulator structure which per se forms no part hereof.

As the temperature within the fuselage in front of this firewall 13 is submitted to considerable variation, that portion of the air delivery pipe 32 surrounding the temperature responsive element 35, is surrounded by a cooling jacket 38 constantly fed with fresh atmospheric air coming from the nose scoop of the airplane through a pipe 39.

The supercharger 29 is any standard blower driven directly from the engine (not shown) at a power take-off pad of the latter.

As its mechanical operation is accompanied by a considerable emission of radiant heat, the temperature of the air entering through its inlet 23 —according to the speed of the engine and the compression ratio—is substantially raised from between its rotating lobes 29' before the air reaches its outlet 33. As the resulting temperature of the air passing through the outlet 33 may be considerably above the temperature required for the cabin C, provisions must be made to cool the compressed air. This cooling is accomplished by the cooler 31, which may be of any known heat-exchange or radiator type. The air to be cooled is forced to circulate in one direction through narrow passages within the cooler, the walls of which passages are cooled by exterior or ram air circulating at high speed in a transverse direction along said walls, and originating from the air-scoop 42 of the plane.

In this embodiment, this ram air comes from the nose scoop 42 of the aircraft, enters the bottom of the cooler 31 as at 42' and is discharged at the top thereof through a pair of pipes 43 opening to the atmosphere on either side of the cowl at 44 in a zone of depression slightly fore and above the leading edge of the wings 11, 12.

The amount of heat transfer effected in the cooler 31 may be adjusted by varying the volume— and to a certain extent the speed, of the ram air transversing the cooler 31, thereby effectively and accurately regulating within certain limits, the temperature of the hot air horizontally traversing the cooler 31 and indirectly the temperature of the air fed to the cabin C. This adjustment is effected by means of shutters 45 throttling the discharge orifices 44. These shutters are manually controlled from the cockpit C through a control lever 46, cooperating with a quadrant 47, a push-pull rod connection 48, a transverse torque rod 49 and operating bell-cranks 50 connecting to the shutters 45.

When the atmospheric temperature is relatively very low, accompanied by the danger of ice formation on the outside and of frost on the inside of the transparent panels of the windshield 17, the temperature of the pressurizing air, instead of being absorbed by the cooler 31, may be utilized for de-frosting. To that end the delivery pipe 32 instead of ending at the firewall 13 is extended within the cabin C to terminate in a check valve 51 of the "flapper" type which in turn connects with a bifurcated pipe 52 thereby bringing the pressurizing air to the lower edge 53 of the windshield 17 and distributes it along said edge through slots or elongated openings 54" provided in said edge 53. From these slots 54" the hot air is deflected against the glass panels of the windshield 17 by means of baffles 54' (see Fig. 11) mounted along the lower inner side of the windshield 17 where it rises along the inner surface of the transparent panels effectively preventing formation of ice or frost thereon before diffusion of the air into the cabin C.

The check valve 51 prevents the back flow of the compressed air from the cabin C into the delivery pipe 32 when the pressure in said pipe falls below the pressure within the cabin C. This may happen either accidentally by failure of the supercharger 29 during supercharged operation, or purposely every time the valve 40 is operated so as to vent the supercharged air through the spillway 41.

In the leading edge of the starboard wing 12 is provided a ventilating intake 54 for ram air, which is symmetrical to the inlet 23 with respect to the vertical plan of symmetry of the aircraft.

The ventilating air entering through said intake 54, passes through a water trap 55, a pipe 56, and a duct 58 passing through the floor 15 of the cabin C. This ventilating air passage 54—58 is also used as an emergency pressure release as will be described later. The flow in either direction of air in said ventilating passage 54—58, is controlled or completely shut off by means of a combined ventilating and emergency pressure release valve 59 (Fig. 10) manually controlled from the cockpit C by means of a handle 60 and a torque rod 61, all as hereinafter described in detail.

The conditioning system of this invention is completed by the provision of a pressure relief valve 62, of the "pop-off" type, which is suitably spring loaded to open automatically into the unpressurized rear portion of the fuselage when a maximum limit of pressure within the cabin C is reached and which is mounted on the inner face of the pilot's rear bulkhead 14 and a vacuum relief valve 63, likewise of the "pop-off" type, which is spring loaded to open automatically into the cabin C when the pressure within said cabin falls below the atmospheric pressure and which is mounted on the outer face of the bulkhead 14.

A standard socket or ground test connection 64 to be normally closed and sealed by plug 65 is provided for ground testing the system by connection to an outside source of compressed air. A sealed socket or ground test connection 66 normally closed and sealed by means of a plug 67 is also provided for connection to a manometer.

The spring loaded pressure relief valve 62 is set to "pop-off" at a given differential pressure (approximately 7.5 lbs. per sq. in.) to prevent excessive pressure "build-up," occurring if the cabin pressure control valve 22 is not functioning properly. Normally said cabin pressure control valve will not permit an excessive negative differential pressure or vacuum to exist within the cabin. However, in a rapid dive to an altitude below 10,000 feet, the valve 22 may have sluggish response. The spring loaded vacuum relief valve 63 is set to "pop-off" at about 1 lb. per sq. in. in order to admit atmospheric air into the cabin C and to approach pressure equalization when that happens.

The "flapper" type check valve 51 is normally kept open by the incoming air from the cabin supercharger 29. This valve will shut automatically to seal the delivery pipe 32 of the cabin C to prevent reverse air flow loss through the supercharger, in event of its failure.

Figs. 4 to 9 show in greater detail the structure and the operation of the companion three-way valves 26 and 40.

Figure 4:
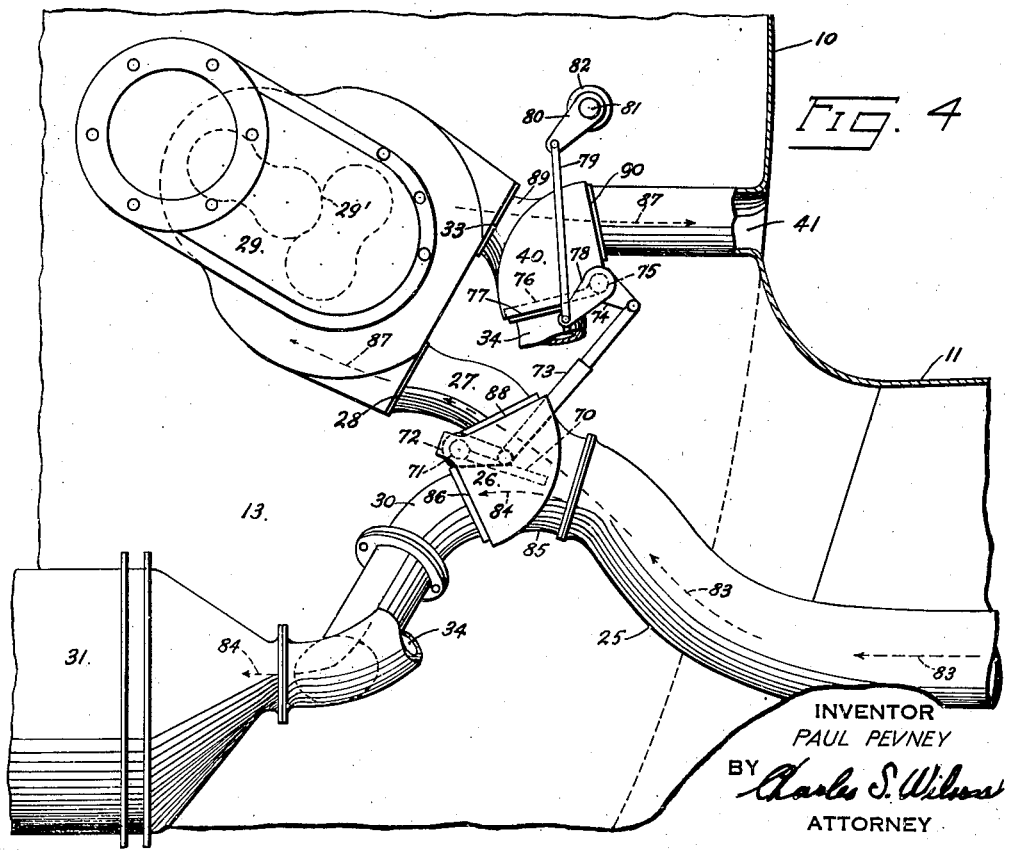
Fig. 4 is an enlarged plan view, with wing and cabin structure in section, of the cabin supercharger and heating connections, the controls thereof being adjusted for normal flight at relatively low altitudes.

In Fig. 4, these valves are shown in their relative positions when the system is operating without delivering compressed and/or heated air to the cabin C.

The valve 26 is provided with a valve plate 70 which is carried for swinging movement within the valve casing by a hinge or pivot pin 71. At one of its ends and exteriorly of the valve 26 the pin 71 has a crank arm 72 fixed thereto by which the position of the plate 70 is adjusted and determined.

The valve 40 is provided with a valve plate 76 which is carried for swinging movement within the valve casing by a hinge or pivot pin 75. At one of its ends and exteriorly of the valve 26 the pin 75 has a crank arm 74 fixed thereto by which the position of the plate 76 is adjusted and determined.

To coordinate the operation of the valve plates 70 and 76 the crank arm 74 of the hinge or pivot pin 75 of the valve 40 is connected to the crank arm 72 of the hinge or pivot pin 71 of the valve 26 by the connecting rod 73 (see Figs. 3, 4 and 9), whereby the adjustment or regulation of the plate 76, as hereinafter described, simultaneously adjusts or regulates the plate 70 of the valve 26.

As described herein the operation of the motor 37 is controlled from the temperature responsive device 35, in a well-known manner and by standard devices and switches, and it is proposed to adjust and regulate the valve plate 76 of the valve 49 and through its adjustment to adjust and regulate the valve plate 70 of the valve 26 from and by the motor 37. To that end a shaft 81 is driven in any standard way by the motor 37 and carries a crank arm 80 at its outer end. This crank arm 80 is connected by a link 79 to a similar crank arm 78 fixed to the hinge or pivot pin 75 of the valve 40. By these connections the operation of the motor 37, as controlled by the temperature responsive device 35, causes the crank arm 80 and its shaft 81 to swing and this movement is imparted to the pivot or hinge pin 75 of the valve 40 by the link 79 operating the crank arm 78 of the pin 75. In turn the pivot or hinge pin 71, of the valve 26, is oscillated by its crank arm 72 and the connecting rod 73. Thus the valve plates 70 and 76 move in unison for their respective adjustments.

As shown in Fig. 4, when the valves 26 and 40 are adjusted or set to permit the operation of the system without the delivery of compressed and/or heated air to the cabin or compartment C, the valve plate 70 of the valve 26 is positioned centrally between the outlets 86—88 of the valve, to act as a baffle which divides the incoming stream 83 of ram air. With the valve plate 70 of the valve 26 so set the valve plate 76 of the valve 40 is firmly seated over the outlet 77 of that valve.

By this adjustment or setting of the valve plates 70—76 incoming ram air stream 83 is divided and its sub-divisions 84 and 87 are so directed by the valves 26 and 40 that no heated or compressed air is delivered to the cabin or compartment C. Thus the division of the incoming air stream 83 from the intake 23 and the pipe 25 produces a current 84 which is directed to the cabin C through the inlet 85 and outlet 86 of the valve 26, the by-pass 30, the then inoperative cooler 31, pipe 32, check valve 51 and bifurcated pipe 52 and slots 54″ from which it is freed or discharged into the cabin C and another current 87, vented into the atmosphere through the exhaust 41 after having passed through the inlet 85 and outlet 88 of valve 26, pipe 27, to the cabin supercharger 29 via its inlet 28 and from the supercharger via its outlet 33, and through the valve 40 via its inlet 89 and outlet 90. The outlet 90 connects with the exhaust tube 41 by which the stream 87 is vented.

At relatively low altitude of flight and high temperature, a constant supply of fresh air 83 is in this manner subdivided into a current 84 for renewing the air of the cabin C, and a current 87 for preventing overheating of the supercharger 29—which is then inoperative both as an air compressor and as a heater, though still running.

If during ascent to higher altitudes, the ambient temperature drops below minimum setting of the temperature responsive device 35, the latter, through the fluid control 36, will operate the switches or other controls (not shown), to actuate the motor 37. This operation of the motor 37 will, through the connections above described, move the valve plate 70 to seal the outlet 86 of the valve 26 thereby closing the by-pass 30 and at the same time move the valve plate 76 from its position sealing the outlet 77 of the valve 40 to a position where it seals the outlet 90 of that valve. By adjustments or settings of the valves 26—40, shown in Fig. 5, the entire stream 83 of ram air is directed through the outlet 88 of the valve 26 and conduit 27 to the supercharger 29. After the supercharger 29 has compressed and heated the air thus delivered to it, the air is discharged through the outlet 33 of the supercharger and inlet 89 of the valve 40 to be directed by that valve to the pipe or duct 34 by which it is conducted to the cooler 31. Once the compressed and heated air has passed from the cooler it is delivered to the cabin or compartment C by and through the conduits and associated elements hereinbefore described.

At and above an altitude of about 10,000 feet, atmospheric rarefaction is too great to support human life in comfort and therefore the automatic pressure regulator or outlet valve 22 functions to reduce or throttle the escape or venting of air from the cabin or compartment C through the valve. The operation of this valve 22 is responsive to the density of the atmospheric air and it functions independently of the present invention and its components. If, at an altitude of about 10,000 feet, the air issuing from the supercharger outlet 33 is still discharged or vented to the atmosphere through exhaust 41, despite this throttling action of the outlet valve 22, there is no substantial compression of the air within the cabin C, beyond the slight compression determined by the ramming action of the intake 23, so long as the ambient temperature remains above the minimum set for the temperature responsive device 35. However, as soon as this minimum temperature is reached the device 35 and its control 36 actuates one of the switches controlling the electric motor 37 for rotation in one direction.

This operation of the motor 37 moves the crank arms 80 and 78 clockwise in unison from the positions shown Fig. 4 to the positions shown Fig. 5, and effects the swinging of the plate 76 of the valve 40 through 90° from the outlet 77 to the outlet 90, thereby establishing communication between the outlet 33 of the supercharger 29 and the pressure conduit 34 and closing the exhaust or vent 41. Simultaneously the crank arm 74 fixed to the hinge or pivot pin 75 of the valve 40 is swung clockwise through 90°. During the first half of this movement of the crank arm 74, the crank arm 72 of the valve 26 is swung clockwise through about 45°, thereby moving the valve plate 70 to close the outlet 86 of the valve 26: and the second half of the movement of the crank arm 74 tightly holds the valve plate 70 applied over the outlet 86 by means of a spring loading sufficient to overcome the pressure existing in the bypass 30, which would otherwise tend to reopen the outlet 86 as soon as a substantial pressure differential is built up in the cabin C. The mechanism applying this load is entirely enclosed within the connecting rod 73 and will be hereinafter described.

With the plates 70 and 76 respectively of the valves 26 and 40 occupying the positions shown in Fig. 5, the entire incoming flow 83 of fresh air from the intake 23 and the pipe 25 is fed to the supercharger 29 and forced through outlet 33, inlet 89 of valve 40, outlet 77 of valve 40, pressure conduit 34, cooler 31, pipe 32, check valve 51, bifurcated pipe 52 and the slots 54'' into the cabin C.

If and when the temperature responsive device 35 by means of the fluid control 36 operates the other of the switches (not shown) controlling the electric motor 37 its rotation is reversed and the components will be restored to their positions disclosed in Fig. 4 and described above.

Figs. 6, 7 and 8 show in larger scale and in greater detail the three-way valves 26 and 40.

The three-way valve 40 (Fig. 6) comprises a more or less triangular housing 91 having two parallel flat sides 92, a curved wall 93 provided with an inlet opening 94 and opposed radial flat walls 95—96 in which are provided the openings forming the outlets 90 and 77 respectively. The circular edge of the inlet opening 94 is flared outwardly as at 97 to create the inlet conduit 89 which has an outstanding flange 98 for assembly to the flange of the cabin supercharger outlet 33. The valve plate 76 is comprised of a rigid flap 99 integral with or radially welded to the hinge or pivot pin 75 and two rubber sealing discs 100, held assembled to the flap 99 by means of two rigid washers 101 and a central rivet 102 traversing the washers, discs and flap. Each of these sealing discs 100 has its circumferential edge portion 103 beveled outwardly from the flap 99. When inactive, the beveled or feathered circular edge portion 103 of each sealing disc 100 forms a conical border sloping slightly away from the flap 99 to lie somewhat out of the approximate plane of the disc 100; while in its active sealing position, the flat face of this edge portion 103 is pressed by contact with the coacting radial wall of the housing 91 toward the flap 99 to lie in the approximate plane of the disc 100. The pivot 75 is rotatably mounted in a bearing block 104 forming the apex of the housing 91, viz.: at the approximate junction of the divergent radial walls 95—96 and is extended at its ends beyond the side walls 92 of the housing 91 to allow for the mounting of the crank arms 74 and 78 thereon.

The three-way valve 26 (Figs. 7 and 8) similarly has a housing 105 having an inlet 85 and two outlets 86—88. The edge of the inlet 85 is flared outwardly to create the inlet conduit 112 which has an outstanding flange 113 for assembly to a corresponding similar flange at the end of the intake pipe 25.

The valve plate 70 of the valve 26 comprises a flap 106 integral with or fixedly secured to the hinge or pivot pin 71 and a rubber sealing disc 107 attached to one of the faces of the flap. This disc 107 is formed in two parts pressed together by and between two rigid washers 108 and 109 disposed against the opposed surfaces of the disc. A rubber washer 110 is positioned between the flap 106 and the adjacent washer 109 and the entire assembly is traversed and held together by a bolt 111. When unpressed, i. e., when the plate 70 is positioned as shown in Fig. 4, the two parts of the sealing disc 107 (Fig. 8) — which are similar to the sealing discs 100 but are reversed in the assembly so that the relatively flat surfaces adjoin and the tapered edge portions 103 converge toward the circumference of the disc 107 — contact only at their peripheries 103 to form a hollow lentil-shaped disc assembly. The rubber washer 110 is suitably proportioned in diameter and thickness to act, more or less, as a universal joint to make up for small maladjustments of the assembled valve plate 70 and to distribute uniformly, along the double feathered edge 103, the pressure applied to the sealing disc 107. As shown, the inner washer 109 is slightly thicker and larger than the outer washer 108 and the edge of the outlet opening 86 is beveled so as to form a conical valve seat for cooperation with the feathered edge 103 of the sealing disc 107.

The hinge or pivot pin 71 of the valve 26 is rotatably mounted in a bearing-block 114 forming the apex of the housing 105 and is extended at one end beyond the housing 105 to permit the attaching of the crank arm 72 fixedly thereto.

In Fig. 7, the valve plate 70 is shown in solid lines sealing the outlet opening 86 leading into the by-pass 30. This position corresponds to the position of the valve 26 shown in Fig. 5 and to the pressurizing operation of the system when the aircraft is flying at altitudes above approximately 10,000 feet. The intermediate position of the valve plate 70, shown in phantom lines, corresponds to the position of the valve 26 shown in Fig. 4 and to the un-pressurized operation of the system when the aircraft is flying at altitudes below 10,000 feet.

Fig. 9 shows the detailed connecting rod 73 joining the crank arm 72 and 74 which incorporates means for applying the spring loading hereinbefore described. The connecting rod 73 is made of two telescoping sections 115 and 116 pivoted respectively to the crank arms 74 and to the crank arm 72. Section 115 comprises two co-extensive parts: a forked bar 117 having an internally threaded socket 118 and a rod 119 having the threads 120 at one end adjustably engaged in the socket 118. The chosen adjustment is maintained by means of a lock nut 121. The tubular part 116 comprise a threaded hollow shank 122 and a head 123 forming the housing for a ball bearing 124, the inner face 125 of which is adapted to be fixed on a pivot (not shown) projecting on one side of the free end of the crank arm 72.

The rod 119 is provided with a circular collar or shoulder 126 and carries a plunger or piston 127 constantly engaged in the bore of the shank 122 with which it has a sliding fit. The telescoping section 115 is guided and kept in alignment with the tubular section 116 by means of a casing 128 internally threaded at one end to receive the threaded shank 122 and provided at its opposite end with an internal shoulder 129 which acts as a guide for the rod 119 and as a stop for the collar 126 determining the maximum extension of the connecting rod 73. A compression spring 130 is housed in the casing 128 on the rod 119 between the end of the shank 122 and the collar 126. This spring is pre-loaded so as to keep normally the collar 126 tightly pressed against the internal shoulder 129, the connecting rod 73 then acting as a strut to transmit the motion of crank arm 74 to crank arm 72 during the first part of the driving movement of the link 79 by the motor 37. However, since the valve plate 76 moves clockwise through 90° as the valve plate 70 moves clockwise through but 45°, the latter is seated prior to the seating of the former. As a consequence the rod 119 is pushed into the casing 128 against the action of this spring 130, thereby storing substantial energy in this spring 130 during the remainder of the movement of the link 79 by the motor 37. The energy thus stored in the spring 130 is adequate to maintain the edge portion 103 of the sealing disc 107 of the plate 70 tightly pressed on the beveled seat 86 in spite of any pressure possible within the by-pass 30.

It is to be noted at this point that the crank arm 74 and the telescopic connecting rod 73 act together as a toggle mechanism, which occupies its dead center position in the closed position of the valve 26 and thus perform as a compression strut, entirely backed on the pivot 75, to withstand the pressure within the by-pass 30.

Fig. 10 shows in larger scale and in more detail the emergency pressure release valve 59. This valve comprises a cylindrical housing 131 integral with a spoked hub 132 having an annular groove 139 for the reception of a valve seat 133 and a disc valve 134 cooperating with said seat 133. The housing 131 is fastened at one end to a vertical bracket 135 fixed upon the floor 15 and is connected at its other end to a flanged end 136 of the pipe 58 by means of screws 137, a gasket 138 being interposed therebetween. The valve seat 133 is made of rubber and is permanently held in the circular groove 139 of the housing, while the disc valve 134 is provided with a hub 140 screwed on a rod 141 slidably mounted in the axis of said housing by means of a flanged bushing 142 in the central opening of the spoked-hub 132 to act as an axial guide. The rod or valve stem 141 projects beyond the flange of the bushing 142 into the pipe 58 and carries on its threaded end 143 a cup-shaped washer 144, a nut 145 and a lock-nut 146. A valve spring 147 encircles the rod 141 between the hub 132 and the washer 144 normally to keep the valve disc 134 constantly pressed against the resilient valve seat 133 with a force sufficient to overcome the slight pressure differential due to the ram air in the pipe 58 when the air in the cabin C is unpressurized. This force may be adjusted and regulated by means of the nut 145 and the lock-nut 146.

The housing 131 is completed on the other side of the bracket 135 by a screened outlet 148 held by a rectangular frame 149 and solid side walls 150 to the bracket 135. When flying at relatively low altitudes with the cabin C unpressurized, the valve 59 is normally closed by the action of the spring 147. This normally closed valve may be manually opened to admit additional fresh air and thereby improve the ventilation of the cabin by the operating lever 60 and the torque tube 61. The end of this tube 61 is pivotally mounted in openings of the walls 150 and carries between said walls a cam 151 having formed therein an eccentric curved slot 152 ending in a circular enlargement 153 of its ends.

The valve stem 141 also has a threaded projection 154 which extends beyond the valve disc 134 into a valve chamber 155, communicating with the screened air outlet 148 through the opening 156 provided in the bracket 135. This projection 154 of the valve stem 141 carries the spaced ears 157 one on each side of the cam 151. A pin 158 passes through the slot 152 of the cam 151 and the ears 157 to provide a bearing for the roller 159 which operates in said slot. In the closed position shown in Fig. 10, a substantial play is provided between the inside periphery of the upper enlargement 153 of the slot 152 and the roller 159 to insure that the action of the spring 147 will seat the valve 134. If this seating of the valve 134 were effected partly by the spring and partly by positive pressure of the cam 151 upon the roller 159 misadjustments or irregularities of the cam assembly could unseat the valve 134 in whole or in part. When moving the lever 60 down to unseat the valve 134, there is initially a small movement of the cam 151 during which it has no effect on the valve followed by actual contact between the roller 159 and walls of the slot 152 in the cam 151 at the junction of the slot 152 and its upper enlargement 153. The progressive opening of the valve 134 takes place against the action of the spring 147 during the riding of the roller along the outer side of the slot 152 of the cam 151, due to the eccentricity of said slot with respect to the center of rotation of the cam. At the opposite end of the slot 152 the roller 159 snaps into the opposite enlargement 153, thereby holding both the valve and the handle assemblies in their respective open positions. When the cabin C is pressurized, the pressure differential existing on both sides of the valve disc 134 assists the spring 147 in keeping said disc tightly pressed upon the resilient seat 133. In an emergency, the same manual valve opening mechanism may be use—in case of failure of both the outlet valve 22 and the automatic safety pressure relief valve 62—to relieve any excessive or dangerous pressure existing within the cabin C.

What is claimed is:

1. The combination with an aircraft having a sealed compartment and an outlet throttle-valve to control automatically the air pressure within said compartment, of a supercharger having an inlet and an outlet, an air intake conduit open to the atmosphere, an air supply duct communicating with said compartment, a venting conduit communicating with the atmosphere, a valve associated with the supercharger inlet, the intake conduit and the air supply duct to direct the air stream from the intake conduit entirely to the supercharger or, in the alternative, in part to the supercharger and in part to the air supply duct, and means cooperating with the supercharger outlet to direct the compressed air delivered thereby either to the air supply duct or, in the alternative, to the venting conduit.

2. The combination with an aircraft having a sealed compartment, of a supercharger having an inlet and an outlet, an air intake conduit open to the atmosphere in the leading edge of one of the wings of said aircraft, an air supply duct communicating with said compartment, a venting conduit communicating with the atmosphere, a by-pass to said air supply duct, a valve associated with the supercharger inlet, the intake conduit and the by-pass to direct the air stream from the intake entirely to the supercharger or, in the alternative, in part to the supercharger and in part to the by-pass for delivery to the air supply duct, and a valve associated with the supercharger outlet, the air supply duct and the venting conduit to direct the compressed air delivered by the supercharger entirely to said air supply duct or, in the alternative, entirely to the venting conduit.

3. The combination with an aircraft having a sealed compartment, of a supercharger having an inlet and an outlet, an air intake conduit open to the atmosphere in the leading edge of one of the wings of said aircraft, an air supply duct communicating with said compartment, a by-pass to said air supply duct, a venting conduit connected to the supercharger outlet, a valve associated with the supercharger inlet, the intake conduit and the by-pass to direct the air stream from the intake conduit entirely to the supercharger or, in the alternative, in part to the supercharger and in part to the by-pass, a valve associated with the supercharger outlet, the air supply duct and the venting conduit to direct the compressed air delivered by the supercharger entirely to the air supply duct or, in the alternative, entirely to the venting conduit, and means for coordinating and simultaneously operating said valves to direct all compressed air from the supercharger to the venting duct upon the division of the air from the intake conduit for delivery to both the by-pass and the supercharger as aforesaid, or to direct all compressed air from the supercharger to said air supply duct upon the delivery of all air from the intake conduit to the supercharger as aforesaid.

4. The combination with an aircraft having a sealed compartment, of a supercharger having an inlet and an outlet, an air intake conduit open to the atmosphere in the leading edge of one of the wings of said aircraft, an air supply duct communicating with said compartment, a by-pass to said air supply duct, a venting conduit, a valve associated with the supercharger inlet, the air intake conduit and the by-pass to direct the air stream from the intake entirely to the supercharger or, in the alternative, in part to the supercharger and in part to the by-pass, a valve associated with the supercharger outlet, the by-pass and the venting conduit to direct the compressed air delivered by the supercharger entirely to said air supply duct or, in the alternative, entirely to the venting conduit, and means for coordinating and simultaneously operating said valves to direct all compressed air from the supercharger to the venting duct upon the division of the air from the intake conduit for simultaneous delivery to both the by-pass and the supercharger as aforesaid, or to direct all compressed air from the supercharger to said by-pass upon the delivery of all air from the intake conduit to the supercharger as aforesaid, including means responsive to the temperature of the compressed air passing through the air supply duct for controlling and initiating the coordinated operation of said valves.

5. The combination with an engine-driven aircraft having a sealed compartment, of a heat-generating supercharger having an inlet and an outlet and continuously driven by said engine, an intake conduit to provide a continuous supply of air to the inlet of said supercharger, an air supply duct communicating with said compartment, a venting conduit, valved means connecting the outlet of said supercharger to said air supply duct only above a predetermined altitude and to said venting conduit only below said predetermined altitude, and a temperature responsive control means associated with the supply duct to automatically operate said valved means at a temperature corresponding substantially to the temperature of the atmosphere at said predetermined altitude.

6. The combination with a compartment, of a heat generating supercharger having an inlet and an outlet, an air supply duct communicating with said compartment, an intake conduit for a supply of relatively cool air, an air cooler associated with said air supply duct to reduce the temperature of the air flowing through the latter, conduits connected to said intake conduit and respectively communicating with the supercharger inlet and with said air supply duct, a conduit from the outlet of said supercharger to said air supply duct and associated cooler, a pair of valves, one cooperating with the intake conduit and the other with the supercharger outlet, adapted to selectively direct air to said air supply duct either directly from the intake conduit or from the supercharger, and a control means, responsive to the temperature of the air entering the compartment, to automatically and differentially operate said two valves in unison.

7. In an aircraft, the combination with a compartment, of a heat generating supercharger having an inlet and an outlet, an air intake conduit open to the atmosphere at the stagnation point of a component of the aircraft to supply air continuously to the inlet of said supercharger, a pressure duct connecting the outlet of said supercharger to said compartment, a cooler in said pressure duct, a by-pass directly connecting said air intake conduit to said cooler and pressure duct, a venting conduit for connecting said outlet of the supercharger directly to the atmosphere, a valve in said intake conduit normally closing said by-pass, a valve in said pressure duct normally closing said venting conduit, and common valve control means, responsive to the temperature of the air issuing from said cooler, to operate said valves automatically and in unison to open both said by-pass and said venting conduit and to close said pressure duct when said temperature rises above a predetermined value.

8. In an aircraft, the combination with a sealed compartment having an outlet valve to automatically control the air pressure within said compartment, of an intake conduit constituting a source of atmospheric air, a heat generating supercharger constituting a source of heated compressed air and having an inlet connected with the air intake conduit and an outlet, a venting conduit, a pressure duct communicating with said compartment, both the pressure duct and the venting conduit being connected to the outlet of the supercharger, valved means cooperating with the outlet of the supercharger for connecting selectively said outlet with the pressure duct or in the alternative with the venting conduit, and thermostatic means for controlling and operating said valved means in response to temperature changes of air in the pressure duct.

9. The combination with an aircraft having a sealed compartment, of an air conditioning system to control the temperature and the pressure of the air within said compartment comprising an intake conduit open to the atmosphere and constituting a source of ram air, an air compressor connected to said intake conduit to heat and compress the air delivered to it by the intake conduit, a pressure duct from the compressor to the compartment, a by-pass from the intake conduit for conveying said ram air directly to the compartment independently of the compressor, a single valve associated with both the by-pass and the inlet of the air compressor, and control means responsive to changes in temperature of the air entering the compartment to position said valve to open said by-pass for the direct delivery of ram air to said compartment when said temperature reaches a predetermined upper limit or in the alternative to position said valve to close the by-pass when said air temperature falls below a predetermined lower limit.

10. The combination with an aircraft having a sealed compartment, of an air conditioning system to regulate the temperature of and the air pressure within the compartment comprising, an intake conduit open to the atmosphere and constituting a source of ram air, a supercharger connected to said intake conduit to heat and compress said ram air, a pressure duct from the supercharger to the compartment, a by-pass from the intake conduit to said pressure duct for conveying said ram air directly to the compartment independently of the supercharger, a single valve associated with and regulating both the by-pass and the inlet of the compressor, and control means responsive to changes in temperature of the air entering the compartment from said pressure duct to position said valve to open said inlet and by-pass and thereby direct ram air simultaneously to both the pressure duct and the supercharger or in the alternative to position said valve to close said by-pass and thereby direct all of the ram air to and through the supercharger.

11. The combination with an aircraft having a cabin, of an air conditioning system to regulate the temperature of and air pressure within the cabin comprising a supercharger having an inlet and an outlet, an air intake conduit continuously feeding ram air to the inlet of said supercharger, a cabin air inlet, a pressure duct connecting the supercharger outlet and said cabin inlet, adjustable cooling means in said pressure duct, a venting conduit to connect the supercharger outlet to the atmosphere, a valve associated with the supercharger outlet, the pressure duct and venting conduit and adjustable to connect either the pressure duct or the venting conduit to the supercharger outlet, and automatic control means, responsive to the temperature of the air entering the cabin, to adjust said valve as aforesaid.

12. The combination with an aircraft having a cabin, of an air conditioning system to regulate the temperature of and air pressure within the cabin comprising a supercharger having an inlet and an outlet and adapted to discharge heated compressed air, an air intake conduit continuously feeding ram air to the inlet of said supercharger, a cabin air inlet, a pressure duct connecting the supercharger outlet and said cabin inlet, a by-pass, a valve associated with the supercharger inlet, the air intake conduit and the by-pass to close or open said by-pass and simultaneously maintain constant connection between the intake conduit and the supercharger inlet, and automatic control means, responsive to the temperature of the air entering the cabin, to regulate said valve whereby it acts as a baffle when open to direct part of the air from the intake conduit to the supercharger inlet and part of said air to said by-pass for delivery to the pressure conduit.

13. The combination with an aircraft having a compartment, of an air compressor having an inlet and an outlet, an air intake conduit open to the atmosphere and connected to the inlet of said compressor, an air pressure duct connected to the outlet of the compressor and communicating with said compartment, a by-pass connecting said air intake conduit to said pressure duct, a venting conduit communicating with the compressor outlet, a primary valve associated with the compressor inlet, the intake conduit and the by-pass to direct the air stream from the intake conduit entirely to the compressor or, in the alternative, in part to the compressor and in part through the by-pass to the pressure duct independently of the compressor, a secondary valve associated with the compressor outlet, the pressure duct and the venting conduit to direct the compressed air discharged by the compressor entirely to the pressure duct or, in the alternative, entirely to the venting duct, a crank arm exteriorly of each valve for its adjustment, a connection between said crank arms for the operation of said valves in unison whereby the primary valve directs the air stream from the intake to both the compressor and the by-pass when the secondary valve directs all air discharged by the compressor to the venting conduit and reversely directs the entire air stream from the intake conduit to the compressor when the secondary valve is adjusted to close the venting conduit aforesaid to direct all air discharged by the compressor to the pressure duct, and means for operating one of said valves whereby the other is operated through said connection.

14. The combination with an aircraft having a compartment, of an air compressor having an inlet and an outlet, an air intake conduit open to the atmosphere and connected to the inlet of said compressor, an air pressure duct connected to the outlet of the compressor and communicating with said compartment, a by-pass connecting said air intake conduit to said pressure duct, a venting conduit communicating with the compressor outlet, a primary valve associated with the compressor inlet, the intake conduit and the by-pass to direct the air stream from the intake conduit entirely to the compressor or, in the alternative, in part to the compressor and in part through the by-pass to the pressure duct independently of the compressor, a secondary valve associated with the compressor outlet, the pressure duct and the venting conduit to direct the compressed air discharged by the compressor entirely to the pressure duct, or, in the alternative, entirely to the venting duct, a valve stem for the adjustment of each of said valves as aforesaid, a crank arm fixed to each valve stem, a connecting rod between said crank arms for the simultaneous adjustment of both valves whereby the primary valve closes the by-pass when the secondary valve closes the venting conduit and reversely the primary valve divides the air stream from the intake conduit between the compressor inlet and the bypass when the secondary valve closes the pressure duct, a motor, a second crank arm fixed to the stem of one of said valves and a connection between said second crank arm and said motor whereby the operation of the motor adjusts said valves in unison as aforesaid and a control for said motor responsive to the temperature of the air passing through said pressure duct.

15. The combination with an aircraft having a compartment, of an air compressor having an inlet and an outlet, an air intake conduit open to the atmosphere and connected to the inlet of said compressor, an air pressure duct connected to the outlet of the compressor and communicating with said compartment, a by-pass connecting said air intake conduit to said pressure duct, a venting conduit communicating with said compressor outlet, a primary valve associated with the compressor inlet, the intake conduit and the by-pass to direct the air stream from the intake conduit entirely to the compressor or, in the alternative, in part to the compressor and in part through the by-pass to the pressure duct independently of the compressor, a secondary valve associated with the compressor outlet, the pressure duct and the venting conduit to direct the compressed air discharged by the compressor entirely to the pressure duct or, in the alternative, entirely to the venting conduit, a rotary member for the adjustment of each of said valves as aforesaid, a crank arm fixed to each of said rotary members, an expansible connecting rod between said crank arms for the simultaneous adjustment of both valves whereby the primary valve closes the by-pass when the secondary valve closes the venting conduit, a motor, a second crank arm fixed to the rotary member of one of said valves and a connection between said second crank arm and said motor whereby the operation of the motor adjusts said valves in unison as aforesaid and an air distribution system within the compartment and connected to the delivery end of said pressure duct, and a temperature responsive control coacting with the pressure duct adjoining its delivery end and with the motor aforesaid for the operation thereof in response to the temperature of the air passing from the duct adjoining its delivery end.

16. The combination with an aircraft having a compartment, of an air compressor having an inlet and an outlet, an air intake conduit open to the atmosphere and connected to the inlet of said compressor, an air pressure duct connected to the outlet of the compressor and communicating with said compartment, a by-pass connecting said air intake conduit to said pressure duct, a venting conduit communicating with the compressor outlet, a primary gate valve associated with the compressor inlet, the intake conduit and the by-pass to swing through approximately 45° to direct the air stream from the intake conduit entirely to the compressor or, in the alternative, to act as a baffle to direct part of the air from the intake conduit to the compressor inlet and part through the by-pass to the pressure duct independently of the compressor, a secondary gate valve associated with the compressor outlet, the pressure duct and the venting conduit to swing through approximately 90° to direct the compressed air discharged by the compressor entirely to the pressure duct or, in the alternative, entirely to the venting duct, a crank arm fixed to each valve gate for its swinging adjustment as aforesaid, a connecting rod between said crank arms whereby said valve gates swing in unison, and means incorporated in said connecting rod for permitting the gate of the secondary valve to swing through substantially 90° while the gate of the primary valve swings through 45°, and means coacting with the secondary valve for operating both valves in unison.

17. The combination with an aircraft having a compartment, of an air compressor having an inlet and an outlet, an air intake conduit open to the atmosphere and connected to the inlet of said compressor, an air pressure duct connected to the outlet of the compressor and communicating with said compartment, a by-pass connecting said air intake conduit to said pressure duct, a venting conduit communicating with the compressor outlet, a primary gate valve associated with the compressor inlet, the intake conduit and the by-pass to swing through approximately 45° to direct the air stream from the intake conduit entirely to the compressor or, in the alternative, to act as a baffle to direct part of the air from the intake conduit to the compressor inlet and part through the by-pass to the pressure duct independently of the compressor, a secondary gate valve associated with the compressor outlet, the pressure duct and the venting conduit to swing through approximately 90° to direct the compressed air discharged by the compressor entirely to the pressure duct or, in the alternative, entirely to the venting duct, a crank arm fixed to each valve gate for its swinging adjustment as aforesaid, a connecting rod between said crank arms whereby said valve gates swing in unison, and means incorporated in said connecting rod for permitting the gate of the secondary valve to swing through substantially 90° while the gate of the primary valve swings through 45° and apply additional seating pressure on the gate of the primary valve consisting in a sleeve pivoted to the crank arm of the primary valve, a rod pivoted to the crank arm of the secondary valve and mounted for reciprocation in the sleeve aforesaid, and a spring within said sleeve and acting upon said rod tending to separate the sleeve and the rod, and operating means cooperating with the crank arm of the secondary valve to move it in either direction to adjust the valves as aforesaid.

18. The combination with an aircraft having a compartment, of an air compressor having an inlet and an outlet, an air intake conduit open to the atmosphere and connected to the inlet of said compressor, an air pressure duct connected to the outlet of the compressor and communicating with said compartment, a by-pass connecting said air intake conduit to said pressure duct, a venting conduit communicating with the compressor outlet, a primary gate valve associated with the compressor inlet, the intake conduit and the by-pass to swing through approximately 45° to direct the air stream from the intake conduit entirely to the compressor, or, in the alternative, to act as a baffle to direct part of the air from the intake conduit to the compressor inlet and part through the by-pass to the pressure duct independently of the compressor, a secondary gate valve associated with the compressor outlet, the pressure duct and the venting conduit to swing through approximately 90° to direct the compressed air discharged by the compressor entirely to the pressure duct or, in the alternative, entirely to the venting duct, a crank arm fixed to the gate of each valve for its swinging adjustment as aforesaid, a connecting rod between said crank arms whereby said valve gates swing in unison, and means incorporated in said connecting rod for permitting the gate of the secondary valve to swing through substantially 90° while the gate of the primary valve swings through 45°, a second crank arm cooperating with the secondary valve to move the first crank arm thereof for the simultaneous adjustment of both valves, a link connected to said crank arm, a motor connected to said link for the reciprocation thereof in either direction, and a thermal control for the operation of said motor in either direction in response to the temperature of the air passing through said pressure duct adjoining its delivery end.

19. The combination with an engine-driven aircraft having a sealed compartment, of air conditioning system to regulate the temperature of and air pressure within said compartment comprising an air compressor constantly driven from the engine having an inlet and an outlet, a pressure duct leading from the compressor outlet to the compartment, a vent to atmosphere leading to the outlet of the compressor, an intake conduit for ram air connected to the compressor inlet, a by-pass from the intake conduit to the pressure duct to deliver ram air to the latter independently of the compressor, a valve associated with and controlling said intake conduit and said by-pass, a separate valve associated with and controlling communication between the compressor outlet and the pressure duct and the vent, and means for operating said valves in unison whereby communication between the pressure duct and the compressor outlet is closed and the vent aforesaid is opened when the by-pass is open and said by-pass and said vent are both closed upon the establishment of communication between the compressor outlet and the pressure duct.

PAUL PEVNEY.

REFERENCES CITED

The following references are of record in the file of this patent:

UNITED STATES PATENTS

| Number | Name | Date |
|---|---|---|
| 2,002,057 | Gregg | May 21, 1935 |
| 2,063,477 | Young et al. | Dec. 8, 1936 |
| 2,119,402 | Puffer | May 31, 1938 |
| 2,208,554 | Price | July 16, 1940 |
| 2,276,371 | Cooper et al. | Mar. 17, 1942 |
| 2,297,495 | Pfau | Sept. 29, 1942 |
| 2,309,064 | Gregg et al. | Jan. 19, 1943 |
| 2,316,416 | Gregg | Apr. 13, 1943 |
| 2,327,737 | Pendergast | Aug. 24, 1943 |
| 2,328,489 | Pfau | Aug. 31, 1943 |
| 2,333,818 | Raney | Nov. 9, 1943 |
| 2,358,835 | Streid | Sept. 26, 1944 |
| 2,391,838 | Kleinhans et al. | Dec. 25, 1945 |
| 2,399,326 | Crot | Apr. 30, 1946 |
| 2,405,670 | Price | Aug. 13, 1946 |
| 2,412,071 | Warner | Dec. 3, 1946 |
| 2,412,110 | Williams, Jr. | Dec. 3, 1946 |
| 2,425,000 | Paget | Aug. 5, 1947 |